May 18, 1937. A. LANSER Re. 20,369
LIQUID MEASURING APPARATUS
Original Filed Nov. 16, 1928
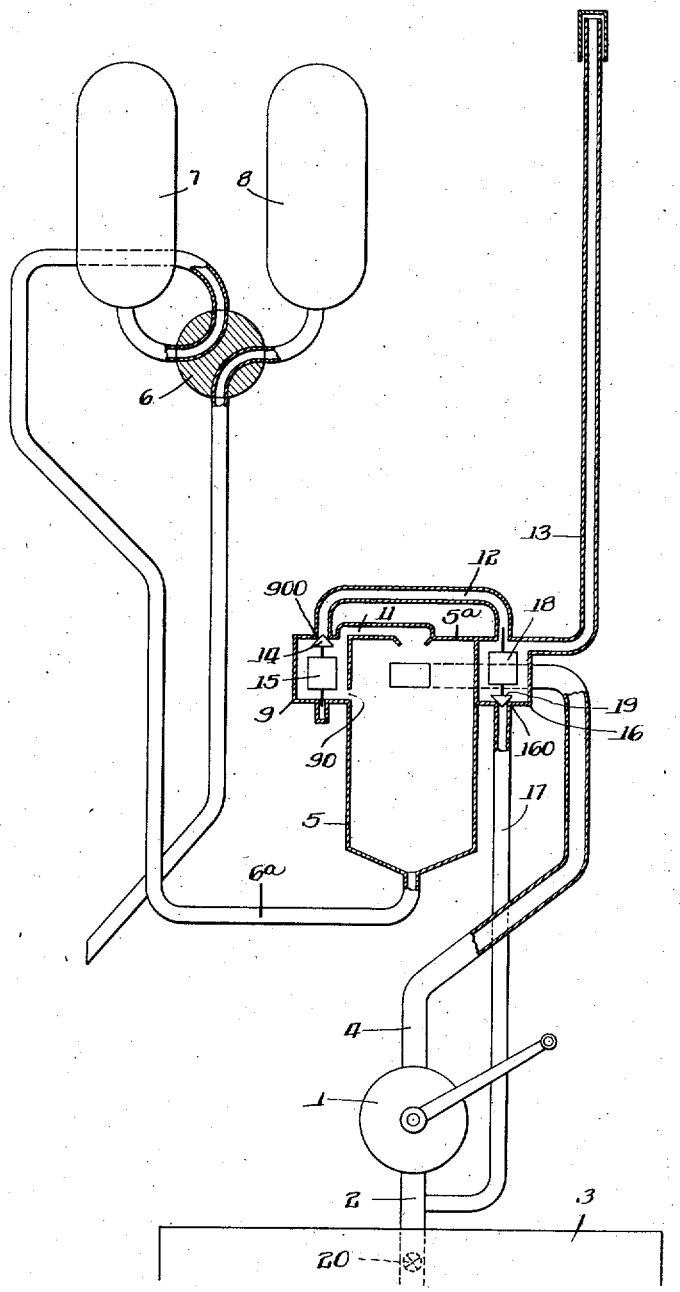
Inventor:
Alfred Lanser,
By: Cox & Moore
attys Reissued May 18, 1937

Re. 20,369

UNITED STATES PATENT OFFICE 20,369

LIQUID MEASURING APPARATUS

Alfred Lanser, Corseaux-Vevey, Switzerland, assignor, by mesne assignments, to S. F. Bowser & Company, Inc., Fort Wayne, Ind.

Original No. 1,783,510, dated December 2, 1930, Serial No. 319,759, November 16, 1928. Application for reissue January 6, 1933, Serial No. 650,453. In France November 2, 1928

13 Claims. (Cl. 183—2.5)

The present invention relates to liquid measuring apparatus, and more particularly, to those of the type designed for use with gasoline, oil, or the like.

One of the objects of the invention is to provide means for separating the gases contained in the liquid to be measured and additional means for recovering the liquid carried off by the separated gases or forced into the vent conduit by back pressure.

Other objects will appear in the course of the detailed description now to be given with reference to the accompanying drawing in which the single figure represents, diagrammatically one constructive embodiment of the invention.

Referring to the drawing, there is shown a pump 1 whose intake conduit 2 is connected to a supply tank 3,—a pump discharge conduit 4 connected tangentially to the upper part of a gas separator 5 which latter delivers through a central discharge conduit 6ª to a 4-way valve 6 controlling the feed to and the discharge from a pair of calibrated measuring reservoirs 7, 8 positioned above the level of 5,—a float chamber 9 communicating through a passage 9⁰ with the liquid in separator 5,—a gas discharge conduit 11 located at the top of chamber 5 and communicating with a recovery conduit 12 through a restricted passage 9⁰⁰ preferably controlled by float 15 and needle valve 14,—a vent conduit 13 in circuit with recovery conduit 12,—a recovery chamber 16 interposed between conduits 12 and 13 and provided with a float 18,—and a return conduit 17 communicating at 19 with chamber 16 and at its other extremity with conduit 2, orifice 19 being controlled by a needle valve 16⁰ connected to float 18. The vent conduit 13 arranged in substantially vertical relation as shown constitutes a stand pipe in which the liquids are deposited from gases passing therethrough from the gas discharge port 9⁰⁰.

The apparatus functions as follows: Liquid to be measured is pumped by pump 1 via conduits 2 and 4 into separator 5 where the vortexial movement of the liquid passing from 4 to 6ª separates the contained gases which discharge via conduit 11 past valve 14 into conduits 12, 13; when the apparatus is not being operated, the liquid in conduit 6ª produces a back pressure in separator 5 tending to force the liquid contained in the latter past valve 14, a valve 20 interposed between elements 2 and 3 preventing a siphoning effect into the supply reservoir; since valve 14 is rarely entirely leak-proof, the liquid forced into conduit 12 has hitherto been lost, but is now recovered via recovery chamber 16 and conduit return and 17.

What I claim is:

1. An apparatus of the class described comprising a supply reservoir, a gas and liquid separator having a gas discharge port normally open to the atmosphere and a liquid discharge port, means for supplying liquid from said reservoir to said separator, a valve adapted to close said gas discharge port, means for recovering liquid passing said gas discharge port valve comprising a recovery chamber communicating with said gas discharge port, normally open to the atmosphere at its upper end and having a valve controlled liquid outlet at its lower end.

2. An apparatus of the class described comprising a supply reservoir, a gas and liquid separator having a gas discharge port and a liquid discharge port, means for passing liquid from said supply reservoir to said gas and liquid separator, a float controlled valve for controlling said gas discharge port, a liquid recovery chamber in communication with said gas discharge port, said liquid recovery chamber having at its upper end a conduit in communication with the atmosphere, a liquid discharge opening at the bottom of said recovery chamber, a float controlled valve governing said liquid discharge opening, and a conduit connecting said liquid discharge opening with said supply reservoir.

3. An apparatus of the class described comprising a supply reservoir, a gas and liquid separator having a gas discharge port and a liquid discharge port, means including a pump for passing the liquid from the supply reservoir to said gas and liquid separator, a stand pipe for separating the liquid from the gas passing through said gas discharge port, said pipe communicating with the latter and with the atmosphere, a liquid recovery chamber communicating with said pipe, and float valve controlled means for returning the liquid from the chamber to the suction side of the pump.

4. An apparatus of the class described comprising a supply reservoir, a gas and liquid separator having a gas discharge port and a liquid discharge port, means including a pump for passing the liquid from the supply reservoir to said gas and liquid separator, means forming a liquid recovery chamber, means for discharging air and gas from said separator to the atmosphere, means for passing liquid from said separator to said liquid recovery chamber, and float controlled means for discharging the liquid in said liquid recovery chamber to the suction side of the pump.

5. In combination with a pump for liquid having a suction chamber and an outlet chamber, an air separating means having a receiving chamber and a float chamber provided with a restricted air passageway therebetween, said receiving chamber having communication with the outlet chamber of said pump and provided with a liquid discharge outlet, a connection for liquid between said float chamber and the sucting chamber of said pump, said float chamber having an air vent, and a float actuated valve including a float in said float chamber for controlling said connection.

6. In combination with a pump for liquid having a suction chamber and an outlet chamber, an air separating means having a receiving chamber and a float chamber provided with an air passageway therebetween, said receiving chamber having communication with the outlet chamber of said pump and provided with a liquid discharge outlet, a connection for liquid between said float chamber and the suction chamber of said pump, said float chamber having an air vent, and a float actuated valve including a float in said float chamber for controlling said connection.

7. An apparatus of the class described comprising a supply reservoir, a gas and liquid separator having a gas discharge port and a liquid discharge port, means including a pump for passing the liquid from the supply reservoir to said gas and liquid separator, means for separating entrained liquid from the gas passing through said gas discharge port, said latter means communicating with the gas discharge port and with the atmosphere, and a liquid recovery chamber communicating with said last named means, said liquid recovery chamber having a return connection to the suction side of the pump and means for preventing air passing through said return connection to the suction side of the pump.

8. An apparatus of the class described comprising a supply reservoir, a gas and liquid separator connected to said reservoir and having a gas discharge port and a liquid discharge port, a pump for passing liquid from the supply reservoir to said separator, a float controlled valve for the gas discharge port of the separator, means for separating entrained liquid from the gas passing through said port, means for discharging the gas to the atmosphere, and a liquid recovery chamber communicating with the gas discharge port and having a return connection to the suction side of the pump, and means for preventing air from passing through the return connection to the suction side of the pump.

9. An apparatus of the class described, comprising a supply reservoir, a gas and liquid separator having a gas discharge port and a liquid discharge port, means comprising a pump having its suction side connected with said supply reservoir and its pressure side connected with said separator for delivering liquid containing gas to said separator, valve means between said pump and said reservoir permitting flow in one direction only from said reservoir through the pump to said separator, means comprising a recovery chamber connected with said gas discharge port and adapted to receive gas discharged from the separator through said port together with any liquid discharged with said gas, said liquid recovery chamber having in its upper portions an opening in communication with atmosphere, a conduit connecting the lower portions of said chamber with the suction side of said pump, and a float controlled valve having float means within said chamber and operatively associated with said conduit for controlling fluid flow therethrough.

10. In combination with a pump for liquid having a suction conduit and an outlet conduit, air separating means comprising a receiving chamber, a float chamber and a restricted air passageway between said chambers, said receiving chamber being connected to the outlet conduit of said pump and being provided with a liquid discharge outlet, a passage for conducting liquid between said float chamber and the suction conduit of the pump, said float chamber having an unrestricted air vent and a float actuated valve in said float chamber for controlling said passage.

11. In combination with a liquid pump having a supply line and a discharge line, a gas separator comprising a receiving chamber connected to the discharge line and provided with a liquid discharge opening and a restricted gas outlet leading from the upper portion of said chamber, a liquid recovering chamber communicating with said restricted gas outlet, a vent for said recovering chamber, a conduit connected to conduct liquid from said liquid recovering chamber to said supply line, and means for preventing gases from entering said conduit.

12. In combination with a liquid pump having a supply line and a discharge line, a gas separator comprising a receiving chamber connected to the discharge line and provided with a liquid discharge opening and a restricted gas outlet leading from the upper portion of said chamber, a recovering chamber adapted to recover liquid entrained in the gas passing through said gas outlet, a constantly open vent for said recovering chamber, a conduit connected to conduct liquid from said liquid recovering chamber to said supply line, and means for preventing gases from entering said conduit.

13. An apparatus of the class described comprising a supply reservoir having a gas and liquid separator connected thereto and a pump for passing liquid from the reservoir to the separator, a liquid outlet for said separator, said separator comprising a plurality of chambers one of which is provided with a restricted gas discharge port, a channel connecting the upper portions of said chambers, means connected to receive and separate the gas and entrained liquid discharged from said port, a vent for said receiving means, a conduit connected to said receiving means for returning liquid from said receiving means to the suction side of the pump and means to prevent passage of gas through said conduit to said pump.

ALFRED LANSER.